No. 827,775. PATENTED AUG. 7, 1906.
R. H. YALE.
SEAT BACK FOR DRIVERS' SEATS.
APPLICATION FILED MAY 20, 1905.
2 SHEETS—SHEET 1.
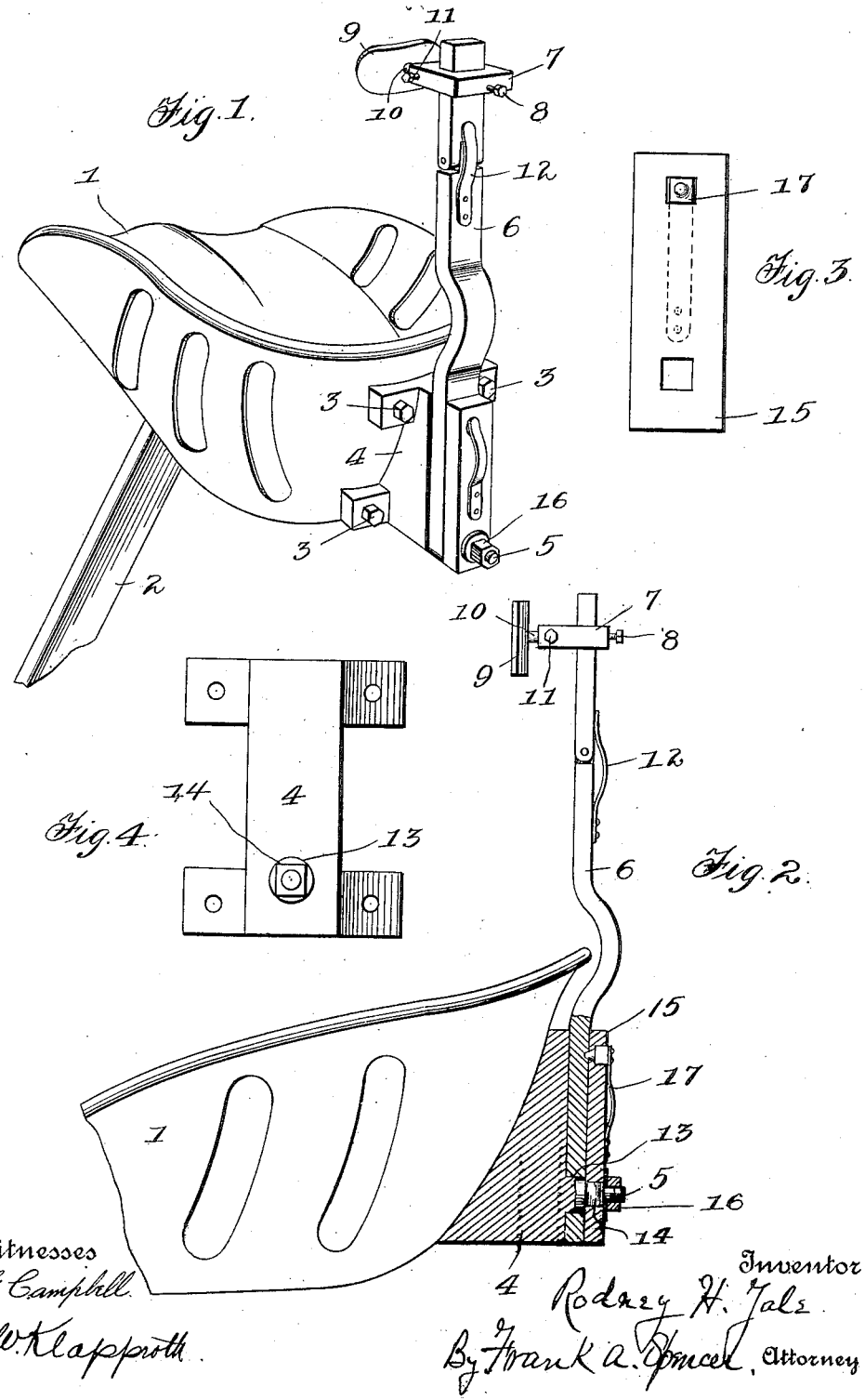

No. 827,775. PATENTED AUG. 7, 1906.
R. H. YALE.
SEAT BACK FOR DRIVERS' SEATS.
APPLICATION FILED MAY 20, 1905.
2 SHEETS—SHEET 2.
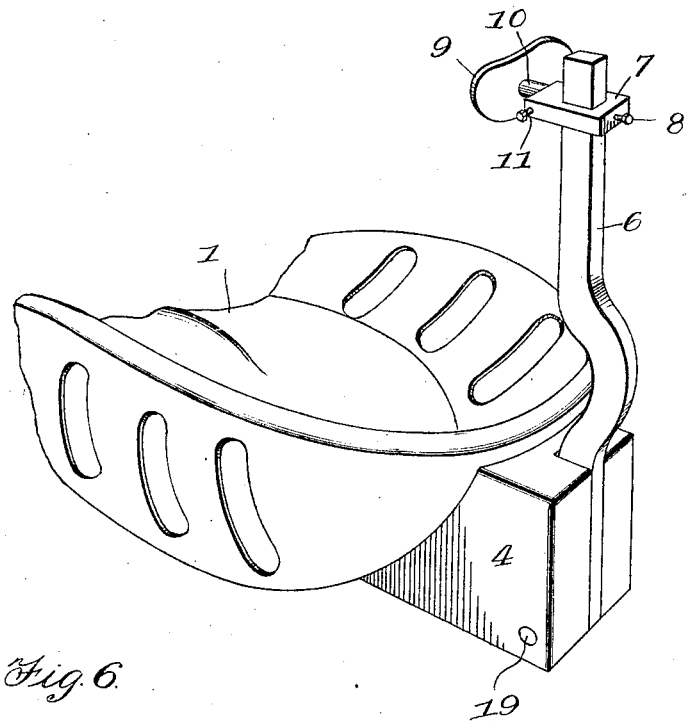
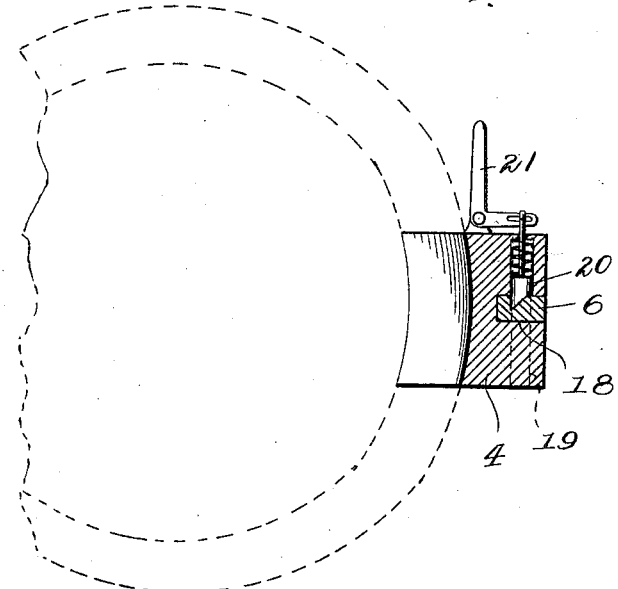
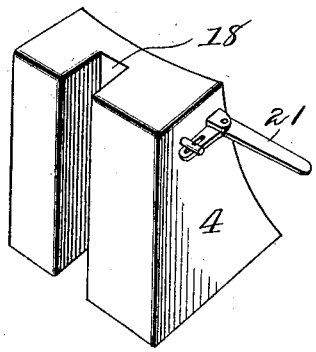
Witnesses
F. G. Campbell
Geo. Klappoth
Inventor
Rodney H. Yale,
By Frank A. Spencer, Attorney

UNITED STATES PATENT OFFICE.

RODNEY H. YALE, OF BEATRICE, NEBRASKA.

SEAT-BACK FOR DRIVERS' SEATS.

No. 827,775.  Specification of Letters Patent.  Patented Aug. 7, 1906.

Application filed May 20, 1905. Serial No. 261,329.

*To all whom it may concern:*

Be it known that I, RODNEY H. YALE, a citizen of the United States, residing at Beatrice, in the county of Gage and State of Nebraska, have invented certain new and useful Improvements in Seat-Backs for Drivers' Seats, of which the following is a specification.

My invention relates to improvements in seat-backs for the driver's seat in wheeled agricultural implements or other like vehicles, and has for its object to provide a back for such seats which shall be adjustable in such a way as when in use to promote the comfort and convenience of the operator and also be capable of being easily removed from its normal working position as a back-rest, but without detaching it from the machine, so that when its use is not desired it will be entirely out of the driver's way, whether he is operating the machine or in the act of mounting to the seat or dismounting from it.

In the accompanying drawings, Figure 1 is a perspective view of my device attached to the driver's seat of an agricultural or other implement. Fig. 2 is a side elevation of the same, partly in vertical section. Fig. 3 is a rear elevation of the spring-plate or locking device for holding the seat-back in vertical or operative position. Fig. 4 is a rear elevation of the casting or block on which the seat-back is supported with the standard and spring-plate removed. Fig. 5 is a perspective view of a modified form of the device in which the seat-back swings to the rear instead of sidewise. Fig. 6 is a top plan view, partly in section, of a spring-catch device or detent for holding the standard as shown in Fig. 5 in operative position. Fig. 7 is a perspective view of the casting or block which supports the standard, as shown in Fig. 5.

1 indicates the driver's seat in an agricultural or other implement or vehicle, said seat being supported on the usual bar 2. Such seats are ordinarily made of pressed steel or cast metal in one piece and bolted to the supporting-bar. To the rear portion of such seat, either integral therewith or preferably connected by bolts 3, I attach a bearing-block 4, to which is pivoted at 5 a normally upright standard 6. On the upper end of said standard 6 and preferably inclosing it is mounted a collar 7, adjustable vertically on standard 6 by means of a set-screw 8.

9 indicates the pad or seat-back proper, which is carried on a sliding pin 10, adjustable longitudinally in a recess in collar 7 by means of a set-screw 11. Fig. 1 shows the upper portion of standard 6, which carries collar 7, as hinged to the lower portion, so as to admit of a rearward yielding movement against the stress of a spring 12, thus forming a cushion for the pad. As shown in Fig. 5 the hinge and spring are omitted.

I have shown in the drawings two methods of pivoting the standard 6 to the block 4, which, though differing somewhat in details, are substantially the same in principle and operation. In Figs. 1 and 2 the standard is mounted to swing to either side, while in Figs. 5 and 6 it swings rearwardly, but so that in either case when not in use it preferably hangs below the seat, depending from its pivot. In the form shown in Figs. 1 and 2 the pivot-pin 5 is preferably integral with block 4 and consists of three portions, one of which, 13, is round to receive the bar 6 and serve as the pivot proper, another portion, 14, which is made angular (see Fig. 4) to receive and hold securely against any turning movement the spring-plate 15, and a third portion, 5, which is round and threaded to receive a nut 16 to hold the parts in place. The spring-plate 15 carries a spring-catch 17, which engages a recess in standard 6 to hold it in an upright position. It will be noted that the spring-catch 17 is so formed that it engages automatically the recess in the standard when the latter is brought to vertical position, and also that the standard may be released from said catch by mere pressure against the standard without any special manipulation of said catch. This construction is of advantage to the operator, as he is thereby enabled to manage the seat-back by the use of one hand only. As shown in Fig. 5, the block 4 is integral with the seat and contains a vertical recess 18, within which standard 6 is pivoted on a transverse pin 19. Upon one side of block 4 is mounted a spring-catch 20, controlled by a bell-crank lever 21 and adapted to engage standard 6 to hold it in upright position.

The special advantage of making the seat-back adjustable and removable in the manner shown and described results from the fact that the drivers' seats in such implements are almost invariably mounted from the rear or from one side and vacated in a like manner, so that if the seat-back were held constantly in upright position it would be an obstacle to the operator. In practice the driver first takes his seat while the back is in pendent or lowered position below the seat, and then by a simple movement of one hand he swings the back into upright position. When dismounting, this movement is reversed.

I am aware that it is common in piano-stools, type-writer's chairs, &c., to mount a back-pad upon a vertical standard, which standard or pad is capable of vertical adjustment and also of being carried rearwardly, so as to vary the position of the pad while retaining its use as a back-rest. My device provides for these adjustments; but I do not claim them broadly as my invention, the peculiarity of which is that when the use of the seat-back is not desired it can be entirely dispensed with and practically removed by throwing it below and preferably underneath the seat, where it remains until again wanted.

My invention, considered broadly, is not limited to the exact details of construction shown and described, and other equivalent or analogous details may be substituted without departing from the essential spirit and scope of my invention.

I claim as new and desire to secure by Letters Patent—

1. In an agricultural implement, a seat, a bearing on the rear of the seat, a standard pivoted on said bearing and mounted to occupy normally an upright position, or to swing downwardly, away from such normal position, below the rim of the seat, an automatic spring-controlled detent arranged to hold said standard in upright position, or to release the same without manipulation of said detent, a hinged portion on the upper end of said standard, a spring providing a yielding movement for said hinged portion, and a back-pad mounted on said hinged portion.

2. A driver's seat, a pivot-pin on the rear thereof, a normally upright standard and a back-pad mounted thereon, said standard being adapted to swing on said pivot to carry the back-pad below the seat, and a portion of said standard being bent rearwardly so that the bend is away from the seat when the standard is in normal position.

3. In a wheeled agricultural implement or other vehicle, a seat, a bearing on the rear of the seat, a pivot-pin extending rearwardly from said bearing and having a cylindrical portion adapted to receive a rotating standard, an angular portion adapted to receive a spring-plate, in combination with a seat-back and standard mounted to swing on said cylindrical portion as a pivot, a supporting spring-plate mounted rigidly on said angular portion, and a detent carried by said spring-plate and adapted to engage said standard to hold it in upright position.

In testimony whereof I affix my signature in presence of two witnesses.

RODNEY H. YALE.

Witnesses:
ALBERT W. KING,
JOHN VON RIESEN.